United States Patent
Ono et al.

(10) Patent No.: US 7,502,046 B2
(45) Date of Patent: Mar. 10, 2009

(54) OPTICAL SCANNING UNIT AND IMAGE FORMING APPARATUS

(75) Inventors: Yasuhiro Ono, Kyoto (JP); Masaki Saka, Nabari (JP); Ayumu Oda, Nara (JP); Takahisa Narikiyo, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 116 days.

(21) Appl. No.: 11/381,766

(22) Filed: May 5, 2006

(65) Prior Publication Data

US 2006/0268095 A1    Nov. 30, 2006

(30) Foreign Application Priority Data

May 31, 2005    (JP)    ............................. 2005-159525

(51) Int. Cl.
B41J 15/14    (2006.01)
B41J 27/00    (2006.01)

(52) U.S. Cl. ........................ 347/242; 347/241; 347/243; 347/256; 347/257; 347/260; 347/261

(58) Field of Classification Search ................ 347/241, 347/242, 243, 256, 257, 260, 261
See application file for complete search history.

(56) References Cited

U.S. PATENT DOCUMENTS 5,995,268 A * 11/1999 Shiraishi et al. ............. 359/204
6,100,912 A * 8/2000 Shiraishi et al. ............. 347/233
2006/0262177 A1 * 11/2006 Wada et al. .................. 347/224
2006/0262373 A1    11/2006 Oda et al.

FOREIGN PATENT DOCUMENTS

| JP | 2004-090675 | 3/2002 |
| JP | 2004-109699 | 4/2004 |
| JP | 2004-109700 | 4/2004 |
| JP | 2004-233638 | 8/2004 |
| JP | 2006-323159 | 11/2006 |

* cited by examiner

*Primary Examiner*—Luu Matthew
*Assistant Examiner*—Kendrick X Liu
(74) *Attorney, Agent, or Firm*—Renner, Otto, Boisselle & Sklar, LLP

(57) ABSTRACT

According to the present invention, highly accurate adjustment of the angles and positions of optical elements constituting an optical scanning unit can be easily performed. The optical scanning unit comprises: a first mirror that reflects the light beams emitted from Y, C and M laser diodes; a second mirror that reflects the light beam emitted from a K laser diode and the light beams reflected by the first mirror; a cylindrical lens that acts on the light beams reflected by the second mirror; and a third mirror that reflects the light beams emitted from the cylindrical lens toward a polygon mirror. The second mirror is provided with an adjusting mechanism that can adjust the light beams in the main scanning direction, and the third mirror is provided with an adjusting mechanism that can adjust the light beams in the sub-scanning direction.

10 Claims, 7 Drawing Sheets

TO POLYGON MIRROR

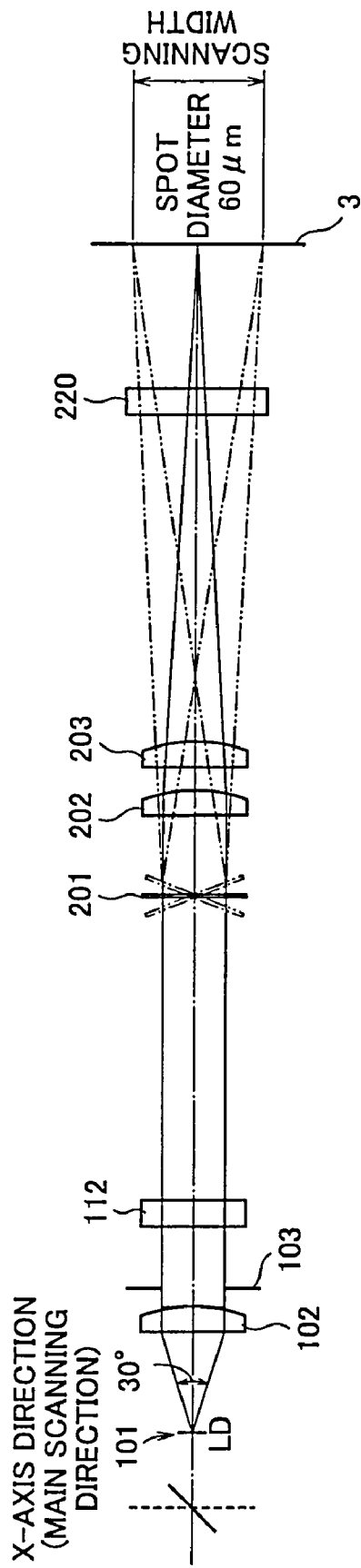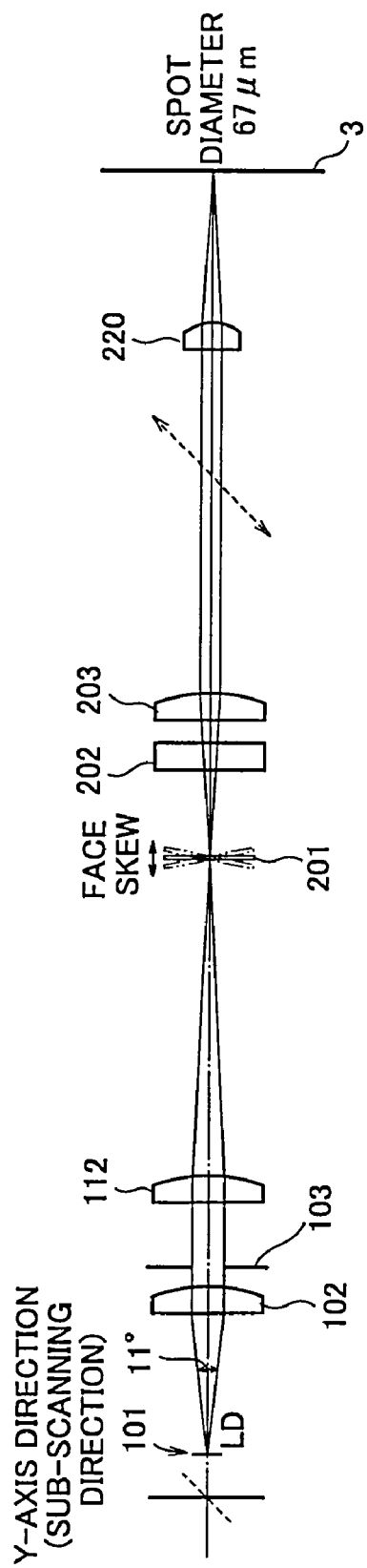

OPTICAL SCANNING UNIT AND IMAGE FORMING APPARATUS

CROSS-NOTING PARAGRAPH

This non-provisional application claims priority under 35 U.S.C. §119(a) on Patent Application No. 2005-159525 filed in JAPAN on May 31, 2005, the entire contents of which are hereby incorporated herein by reference.

FIELD OF THE INVENTION

The present invention relates generally to an optical scanning unit and an image forming apparatus equipped with the optical scanning unit, and, more particularly, to an optical scanning unit used for electrophotographic image forming apparatuses such as digital copy machines, printers, and facsimile machines, for example.

BACKGROUND OF THE INVENTION

Image forming apparatuses such as digital copy machines, laser printers, or facsimile machines are widely used. Such an image forming apparatus uses an optical scanning unit that scans a laser beam. When an image is formed in the image forming apparatus, after a photoreceptor is charged by a charging unit, an electrostatic latent image is formed on the photoreceptor by the optical scanning unit by writing according to image information. The electrostatic latent image on the photoreceptor is developed by toner supplied from a development unit. The toner image developed on the photoreceptor is transferred to recording paper by a transfer unit and is fixed on the recording paper by a fixing unit to obtain a desired image.

Along with speeding up of color image forming apparatuses such as digital copy machines and laser printers, a tandem-mode apparatus is in practical use which includes a plurality of photoreceptors in tandem arrangement. In this case, for example, four photoreceptor drums are arranged in the conveying direction of the recording paper; each photoreceptor is simultaneously exposed to light by a scanning optical system corresponding to each photoreceptor drum to form a latent image; and these latent images are developed by development units that use developers with different colors such as yellow, magenta, cyan, and black. The developed toner images are sequentially transferred on the same recording paper in an overlapping manner to obtain a color image.

As compared to a mode that forms each color image with one photoreceptor sequentially, since the tandem mode exposing a plurality of photoreceptors simultaneously can output color and monochrome images at the same speed, the tandem mode is advantageous in high-speed printing. On the other hand, since scanning optical systems corresponding to a plurality of photoreceptors are necessary, a unit for exposing the photoreceptors tends to be large in size and the challenge is to miniaturize the unit. Another challenge is to eliminate color drift when the toner image developed on each photoreceptor is transferred to the recording paper in an overlapping manner.

With regard to the tandem-mode image forming apparatus as described above, for example, Japanese Laid-Open Patent Publication Nos. 2004-109700 and 2004-109699 disclose an optical scanning unit that includes a wedge-shaped prism disposed on an optical path from a light source unit to deflecting means and a writing start position correcting means for rotating and adjusting the wedge-shaped prism around an optical axis to vary a position of a beam spot in the sub-scanning direction, and the optical scanning unit can control the beam spot position on a photoreceptor drum during the writing of image data. At the time of continuous printing, relative color drift of each color can be corrected effectively to output a good color image with less color drift.

Japanese Laid-Open Patent Publication No. 2004-233638 discloses a lens adjustment apparatus that includes: a light source; a device that divides the light emitted from the light source into four light beams; an adjustment device that drives a second lens on a plane where a normal line is the optical axis of the second lens; a diffraction grating that diffracts the collected light beams from the first and second lenses to generate interference; a micromotion stage that drives the diffraction grating in the direction including a component of a direction vertical to the groove direction of the grating plane; four interference image observation systems that are constituted by an objective lens, an imaging lens, and a CCD camera to observe the interference light; a processing device that processes the four interference images to detect one aberration from aberrations sensitive to the decentering of the second lens; and a control device that detects an adjustment amount from the detected aberration to drive the adjustment device, and the lens adjustment apparatus can adjust a lens with small NA highly accurately.

Japanese Laid-Open Patent Publication No. 2002-90675 discloses an optical scanning unit that includes: an optical deflection device that deflects light in a predetermined direction; a plurality of laser elements; a pre-deflection optical system that includes a glass lens and a plastic lens to convert a cross-sectional shape of light emitted from each laser element into a predetermined shape; and a post-deflection optical system that includes two lenses forming an image such that each of the light deflected by the optical deflection device is scanned on a predetermined image plane at a constant speed. The power of the two lenses of the deflection optical systems is regulated to be positive relative to the direction orthogonal to the rotation axis of the reflection face of the optical deflection device. At least one of the lens surfaces of each of the lenses is formed to be a lens without rotational symmetric surfaces. In this way, an optical scanning unit can be provided which is suitable for an image forming apparatus that can provide a color image without color drift at low cost.

In the optical scanning unit, a multiplicity of optical elements such as lenses and mirrors is disposed at optimum positions. Such optical elements are disposed to guide an optical path of a light beam emitted from a light emitting element composed of a laser diode, to adjust the beam shape, and to illuminate a photoreceptor accurately. In some cases, such optical elements must be adjusted in positions or angles at the time of the assembly adjustment of the unit or after the subsequent operation.

For example, if optical elements of an optical system making the light beam converge on a polygon mirror for scanning the light beam are displaced, for example, the writing position of the light beam on the photoreceptor is displaced from an appropriate position, which makes a problem that the quality of the image formed on the photoreceptor is deteriorated.

With regard to the adjustment of the optical elements, it is preferred that highly accurate adjustment can be easily performed. In this case, adjusting means of the optical element must be able to adjust the angle and position thereof highly accurately without affecting the characteristic of the optical element.

SUMMARY OF THE INVENTION

An object of the present invention is to provide an optical scanning unit that includes an adjusting mechanism capable of performing highly accurate adjustment easily in the adjusting mechanism that adjusts angles and positions of optical elements constituting an optical system for scanning laser beams. And another object of the present invention is to provide an image forming apparatus equipped with such an optical scanning unit.

Another object of the present invention is to provide an optical scanning unit that irradiates a polygon mirror with a plurality of light beams emitted from a light source according to image data, that converts the plurality of light beams to scanning lights by the rotation of the polygon mirror, and that scans and exposes a plurality of photoreceptors simultaneously with the plurality of scanning lights to form latent images on the respective photoreceptors, wherein, in the optical scanning unit, optical elements irradiating the polygon mirror with each light beam are configured integrally and wherein the optical scanning unit comprises means for adjusting at least light beams illuminating the polygon mirror collectively in the main scanning direction and means for adjusting at least the light beams illuminating the polygon mirror in the sub-scanning direction.

Another object of the present invention is to provide the optical scanning unit, wherein the means for collectively adjusting the light beams are provided on the both sides of a lens that has a power only in the sub-scanning direction for collecting the respective light beams linearly in the main scanning direction on the polygon mirror.

Another object of the present invention is to provide the optical scanning unit, wherein the adjusting means include means that can change the respective light beams in the main scanning direction on the near side of the optical path of the lens that has a power only in the sub-scanning direction from the light source and means that can change the respective light beams in the sub-scanning direction on the far side of the optical path of the lens that has a power only in the sub-scanning direction from the light source.

Another object of the present invention is to provide the optical scanning unit, the optical scanning unit comprising: a first laser diode, a second laser diode, a third laser diode, and a fourth laser diode, which act as the light sources; a first mirror that reflects the light beams emitted from the second to fourth laser diodes; a second mirror that reflects the light beam emitted from the first laser diode and the light beams reflected by the first mirror; a primary optical system cylindrical lens that acts on the light beams reflected by the second mirror; and a third mirror that reflects the light beams emitted from the primary optical system cylindrical lens toward the polygon mirror, wherein the lens that has a power only in the sub-scanning direction is the cylindrical lens, wherein the second mirror is provided with the means that can change the light beams in the main scanning direction, and wherein the third mirror is provided with the means that can change the light beams in the sub-scanning direction.

Another object of the present invention is to provide the optical scanning unit, wherein the first mirror is constituted by a mirror group composed of a plurality of mirrors.

Further, another object of the present invention is to provide an image forming apparatus comprising the optical scanning unit and the photoreceptors, wherein the optical scanning unit forms latent images on the photoreceptors, the latent images being developed for image formation.

BRIEF DESCRIPTION OF THE DRAWINGS

FIGS. 5A and 5B are diagrams for describing the state of the individual light beam of each color in the primary optical system and the secondary optical system.

PREFERRED EMBODIMENTS OF THE INVENTION

Figure 1:
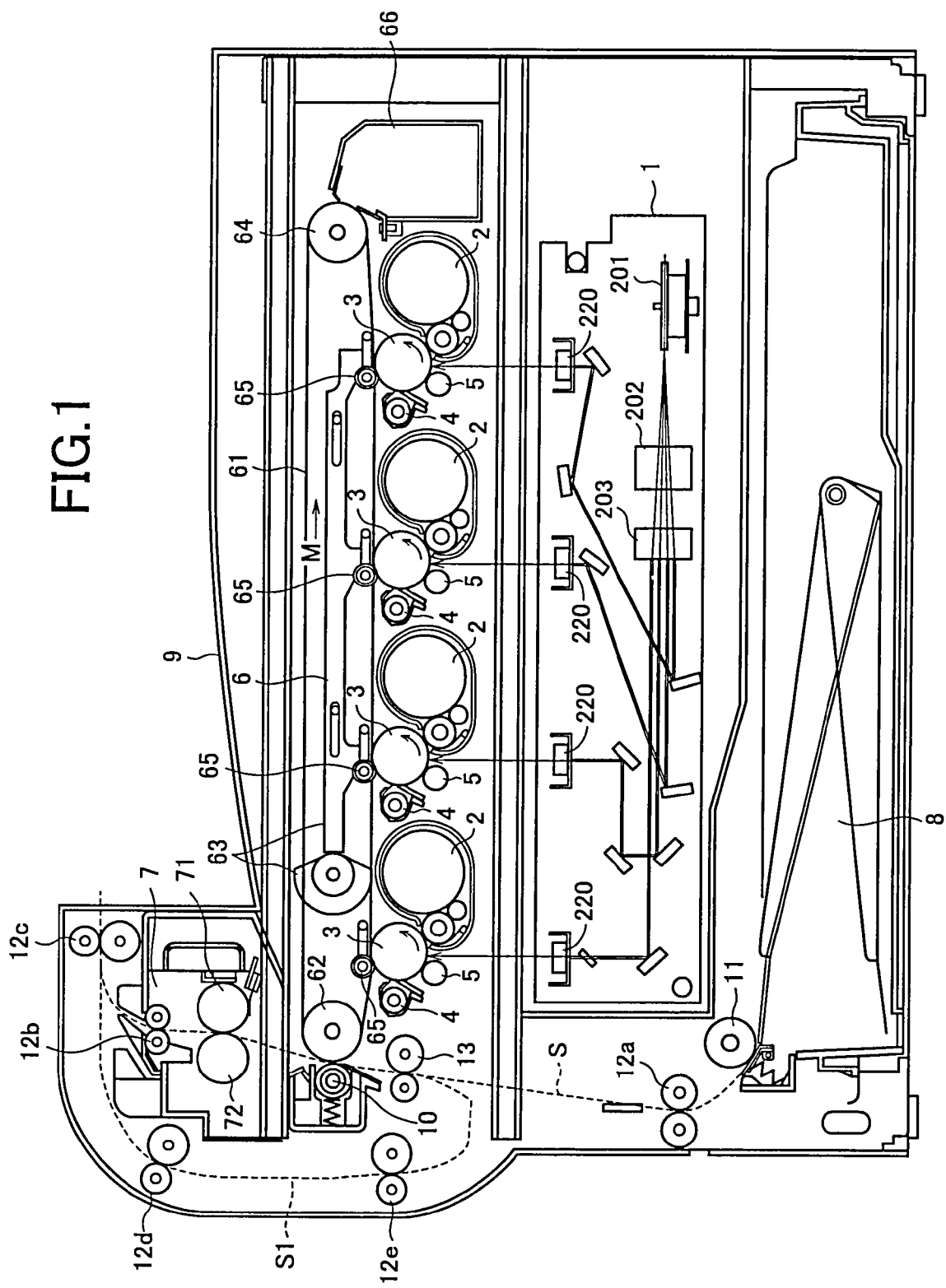
FIG. 1 shows a configuration example of an image forming apparatus using an optical scanning unit of the present invention.

FIG. 1 shows a configuration example of an image forming apparatus using an optical scanning unit of the present invention. The image forming apparatus forms a multicolor or monochrome image on a predetermined sheet (recording paper) depending on image data transmitted from outside. As shown in FIG. 1, the image forming apparatus is constituted by an exposure unit 1, development units 2, photoreceptor drums 3, cleaner units 4, charging units 5, an intermediate transfer belt unit 6, a fixing unit 7, a paper feeding cassette 8, a paper ejection tray 9, etc.

The image data handled in the image forming apparatus correspond to a color image using colors of black (K), cyan (C), magenta (M), and yellow (Y). Therefore, four sets of the development units 2, the photoreceptor drums 3, the charging units 5, and the cleaner units 4 are provided such that four types of latent images according to respective four colors are formed and each set is set to black, cyan, magenta, or yellow to constitute four image stations.

The charging unit 5 is charging means for electrostatically charging the surface of the photoreceptor drum 3 uniformly to a predetermined electric potential and, in addition to the contact type such as roller type or brush type as shown in FIG. 1, a charger type charging unit may be used.

The exposure unit 1 corresponds to the optical scanning unit relating to the present invention and is configured to be a laser scanning unit (LSU) equipped with a laser irradiating portion and a reflecting mirror as shown in FIG. 1. The exposure unit 1 is provided with a polygon mirror 201 that scans laser beams, and optical elements such as lenses and mirrors for guiding the light beams reflected by the polygon mirror 201 to the photoreceptor drums 3. The configuration of the optical scanning unit constituting the exposure unit 1 will be described in detail later. In some techniques, for example, the exposure unit 1 may be an EL or LED writing head where light emitting elements are arranged in an array.

The exposure unit 1 has a function for exposing the charged photoreceptor drums 3 according to the input image data to form electrostatic latent images corresponding to the image data on the surfaces of the photoreceptor drums 3. The development unit 2 develops the electrostatic latent image formed on each photoreceptor drum 3 with toner of each of four colors (Y, M, C, and K). The cleaner unit 4 removes and collects the toner remaining on the surface of the photoreceptor drum 3 after the development and the image transfer.

The intermediate transfer belt unit 6 is disposed above the photoreceptor drums 3 and includes an intermediate transfer belt 61, an intermediate transfer belt driving roller 62, an intermediate transfer belt tension mechanism 63, an intermediate transfer belt driven roller 64, intermediate transfer rollers 65, and an intermediate transfer belt cleaning unit 66. Four intermediate transfer rollers 65 are provided for respective four colors of Y, M, C, and K.

The intermediate transfer belt 61 is laid with tension and is rotationally driven in the direction indicated by an arrow M by the intermediate transfer belt driving roller 62, the intermediate transfer belt tension mechanism 63, the intermediate transfer belt driven roller 64, and the intermediate transfer rollers 65. Each intermediate transfer roller 65 is rotatably supported by an intermediate transfer roller attachment portion of the intermediate transfer belt tension mechanism 63 of the intermediate transfer belt unit 6 and gives a transfer bias for transferring the toner image on the photoreceptor drum 3 onto the intermediate transfer belt 61.

The intermediate transfer belt 61 is provided so as to contact with each photoreceptor drum 3. The intermediate transfer belt 61 has a function for forming a color toner image (multicolor toner image) on the intermediate transfer belt 61 by transferring the toner image of each color formed on the photoreceptor drum 3 sequentially onto the intermediate transfer belt 61 in an overlapping manner. The intermediate transfer belt 61 is formed using a film with a thickness of about 100 μm to 150 μm so as to have no end.

The transfer of the toner image from the photoreceptor drum 3 to the intermediate transfer belt 61 is performed by the intermediate transfer roller 65 in contact with the back side of the intermediate transfer belt 61. To the intermediate transfer roller 65, a high-voltage transfer bias (high voltage with the opposite polarity (+) to the charging polarity (−) of the toner) is applied for transferring the toner image. The intermediate transfer roller 65 is a roller having a base of a metal (e.g., stainless steel) shaft with a diameter of 8 to 10 mm and the surface of the shaft is covered with a conductive elastic material (e.g., EPDM, urethane foam, etc.). With the conductive elastic material, the high voltage can be applied uniformly to the intermediate transfer belt 61. Although the roller shape is used for the transfer electrode in this embodiment, a brush may be used.

The electrostatic image is developed on each photoreceptor drum 3 correspondingly to each color as described above and is laminated on the intermediate transfer belt 61. With the rotation of the intermediate transfer belt 61, the laminated image information is transferred onto paper by a transfer roller 10 (described later) disposed at a contact position between paper and the intermediate transfer belt 61.

The intermediate transfer belt 61 and the transfer roller 10 are pressed against each other with a predetermined nip and a voltage (high voltage with the opposite polarity (+) to the charging polarity (−) of the toner) is applied to the transfer roller 10 to transfer the toner to paper. To obtain the nip constantly with the transfer roller 10, one of the transfer roller 10 and the intermediate transfer belt driving roller 62 is made of a hard material (e.g., metal) and the other utilizes a soft material roller such as an elastic roller (e.g., elastic rubber roller or resin foam roller).

Since color mixture at the next procedure is generated by the toner attached to the intermediate transfer belt 61 by contacting with the photoreceptor drum 3 or by the toner that is not transferred onto paper by the transfer roller 10 and remained on the intermediate transfer belt 61, the toner is configured to be removed and collected by the intermediate transfer belt cleaning unit 66. The intermediate transfer belt cleaning unit 66 includes, for example, a cleaning blade that is a cleaning member contacting with the intermediate transfer belt 61 and the intermediate transfer belt 61 contacting with the cleaning blade is supported by the intermediate transfer belt driven roller 64 from the back side.

The paper feeding cassette 8 is a tray for storing sheets (recording paper) used for forming images and is provided on the under side of the exposure unit 1 of the image forming apparatus. The paper ejection tray 9 is provided on the top side of the image forming apparatus and is a tray for accumulating the printed sheets face-down.

The image forming apparatus is provided with a paper conveying path S in a substantially vertical shape for sending the sheets in the paper feeding cassette 8 to the paper ejection tray 9 via the transfer roller 10 and the fixing unit 7. A pickup roller 11, a plurality of conveying rollers 12a to 12e, a resist roller 13, the transfer roller 10, the fixing unit 7, etc. are disposed near the paper conveying path S from the paper feeding cassette 8 to the paper ejection tray 9.

The conveying rollers 12a to 12e are small rollers for facilitating and aiding the conveyance of the sheets and are provided along with the paper conveying path S. The pickup roller 11 is provided near the end of the paper feeding cassette 8 and picks up the sheets one-by-one from the paper feeding cassette 8 to supply the sheets to the paper conveying path S.

The resist roller 13 holds the sheet conveyed through the paper conveying path S temporarily. The resist roller 13 has a function for conveying the sheet to the transfer roller 10 at the timing when the leading end of the toner image on the photoreceptor drums 3 is matched with the leading end of the sheet.

The fixing unit 7 includes a heat roller 71 and a pressure roller 72, and the heat roller 71 and the pressure roller 72 hold the sheet and are rotated. The heat roller 71 is set to be a predetermined fixing temperature by a controlling portion based on a signal from a temperature detector not shown and performs the thermocompression of the toner to the sheet along with the pressure roller 72 to melt/mix/press the multicolor toner image transferred to the sheet to thermally fix the image to the sheet.

Detailed description will be made of the sheet conveying path. As described above, the image forming apparatus is provided with the paper feeding cassette 8 preliminary storing the sheets. To feed the sheets from the paper feeding cassette 8, the pickup roller 11 is disposed to guide the sheets to the conveying path S one-by-one.

The sheet fed from the paper feeding cassette 8 is conveyed to the resist roller 13 by a conveying roller 12a on the paper conveying path S and is conveyed to the transfer roller 10 at the timing of matching accurately the leading end of the sheet with the leading end of the image information on the intermediate transfer belt 61, and the image information is written onto the sheet. Subsequently, when the sheet passes through the fixing unit 7, the unfixed toner on the sheet is thermally melted and fixed and the sheet passes through a conveying roller 12c disposed behind the fixing unit 7 and is ejected on the paper ejection tray 9.

The above conveying path is used when one-side printing is requested for the sheet and, when two-side printing is requested, after the one-side printing is completed as described above and the rear end of the sheet which has passed through the fixing unit 7 is chucked by the final conveying roller 12c, the conveying roller 12c is rotated reversely to guide the sheet along conveying path S1 via conveying rollers 12d, 12e. Subsequently, after the sheet passes through the resist roller 13 and the back side of the sheet is printed, the sheet is ejected on the paper ejection tray 9.

Specific description will be made of the embodiment of the optical scanning unit of the present invention.

The optical scanning unit of the embodiment can be applied to the tandem-mode image forming apparatus that has a plurality of the photoreceptor drums 3 as described above to form a color image by simultaneously scanning and exposing the photoreceptor drums 3 with a plurality of light beams to form images with different colors on the respective photoreceptor drums 3 and by overlapping the images of respective colors on the same transfer medium.

As described above, the image forming apparatus is provided with the photoreceptor drum for forming a black (K) image, the photoreceptor drum for forming a cyan (C) image, the photoreceptor drum for forming a magenta (M) image, and the photoreceptor drum for forming a yellow (Y) image at substantially even intervals. Since the image of each color is formed simultaneously, the tandem-mode image forming apparatus can reduce the time for forming a color image considerably.

In the following description, K, C, M, and Y stand for black, cyan, magenta, and yellow, respectively.

The optical scanning unit according to the present invention for exposing the photoreceptor drums 3 is constituted by a primary optical system (incoming optical system) and a secondary optical system (outgoing optical system). The primary optical system includes four semiconductor lasers emitting Y, M, C, and K light beams, respectively, and optical elements such as mirrors and lenses guiding these light beams to a polygon mirror 201 (rotational polygon mirror) of the secondary optical system. The secondary optical system includes the polygon mirror 201 that scans the laser beams on the photoreceptor drums 3, i.e., scanned objects, optical elements such as mirrors and lenses guiding the light beams reflected by the polygon mirror 201 to the photoreceptor drums 3, and a BD sensor that detects the light beams. The polygon mirror 201 is configured to be shared by each color.

Figure 2:
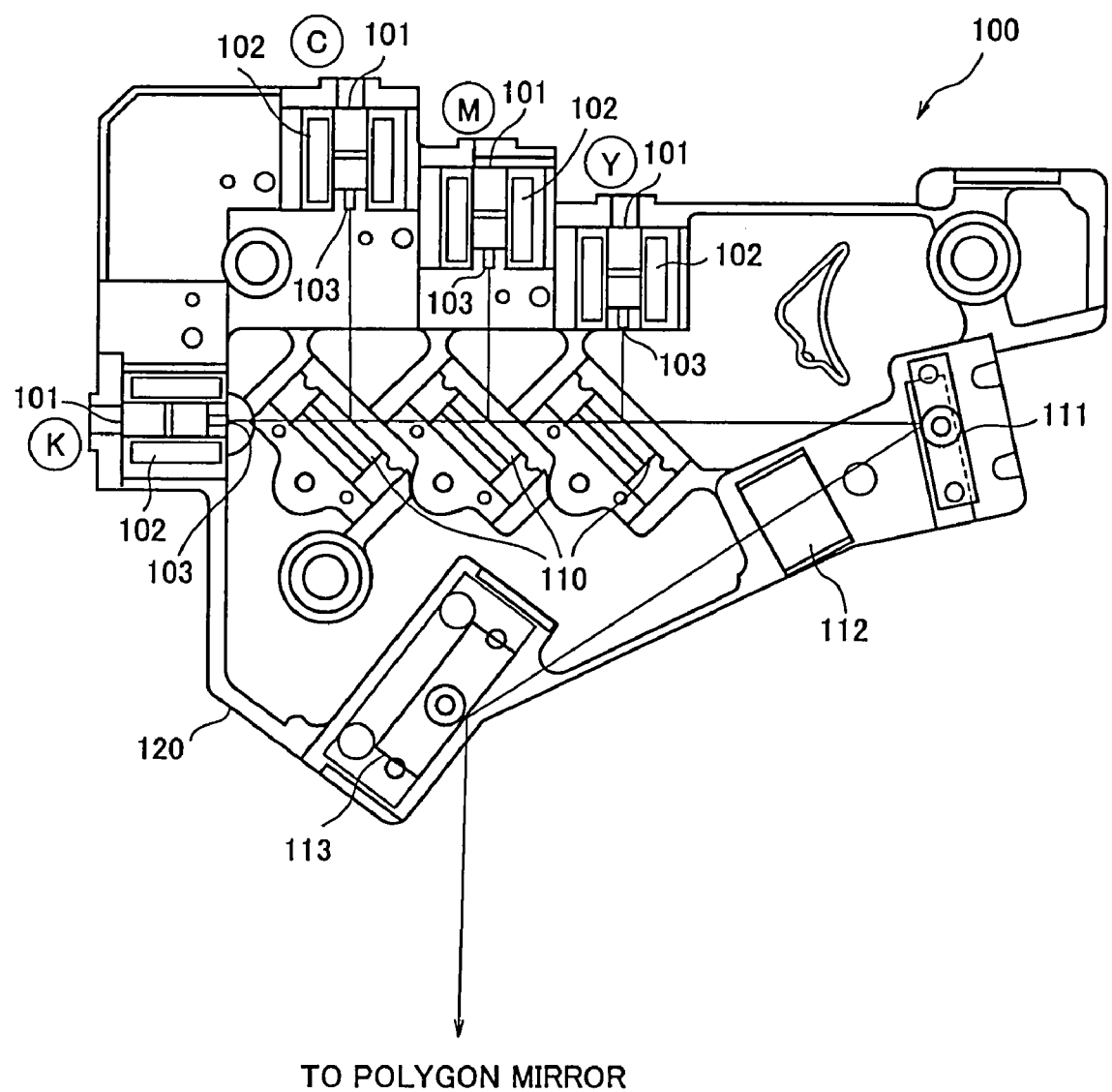
FIG. 2 is a plan view of a configuration example of a primary optical system unit of the optical scanning unit of the present invention.
Figure 3:
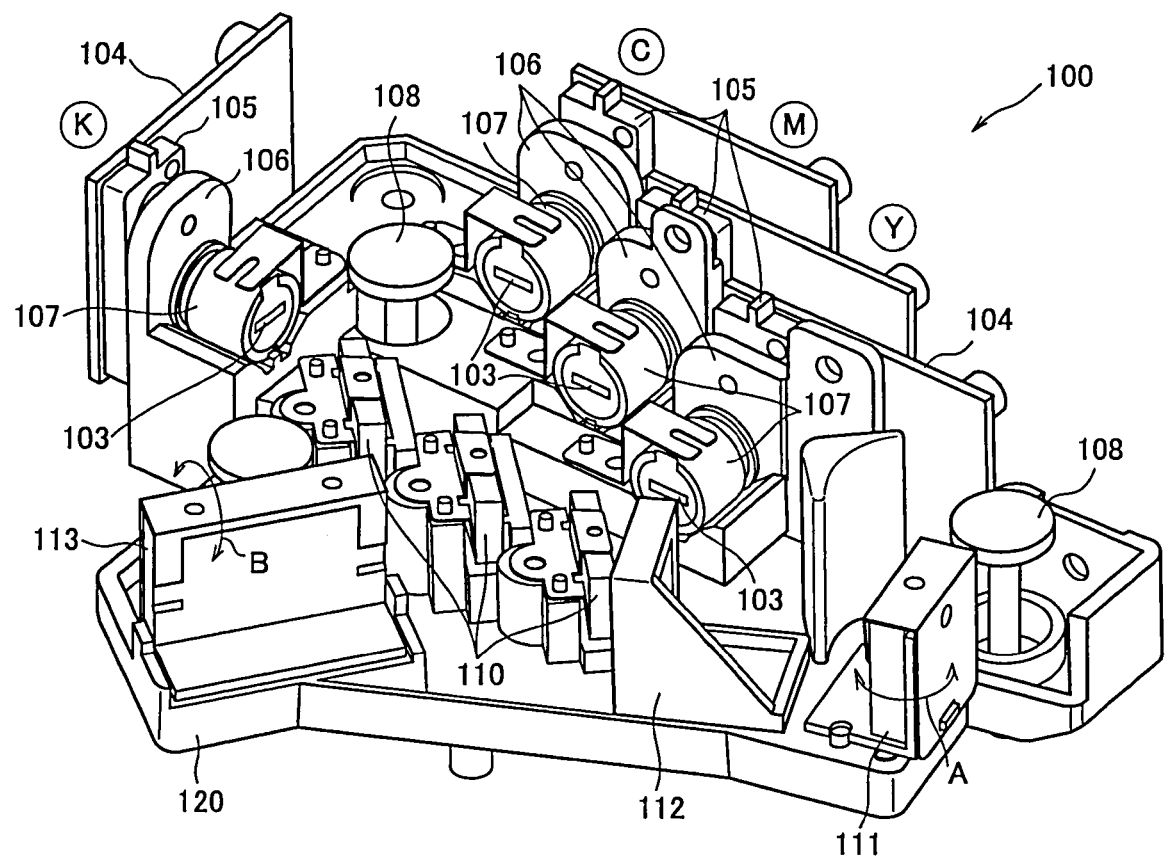
FIG. 3 is a perspective schematic diagram of the primary optical system unit of FIG. 2.

FIG. 2 is a plan view of a configuration example of the primary optical system unit of the optical scanning unit of the present invention and FIG. 3 is a perspective schematic diagram of the primary optical system unit of FIG. 2. In FIGS. 2 and 3, a numeral 100 is the primary optical system unit; a numeral 101 is a laser diode; a numeral 102 is a collimator lens; a numeral 103 is an aperture; a numeral 104 is a laser drive substrate; a numeral 105 is a laser holder; a numeral 106 is a lens holder; a numeral 107 is a body tube; a numeral 108 is a attachment screw; a numeral 110 is a first mirror; a numeral 111 is a second mirror; a numeral 112 is a cylindrical lens; a numeral 113 is a third mirror; and a numeral 120 is a base for installing the optical elements of the primary optical system.

Each of K, C, M, and Y laser diodes 101 is driven by a laser drive circuit (not shown) that is light source driving means. The laser drive circuit receives various control signals output from a controlling portion of the image forming apparatus and the image data supplied from an image processing portion and controls the emission of each laser diode 101 in accordance with these control signals and image data.

On the laser emitting side of each laser diode 101, the collimator lens 102 is provided for K, C, M, and Y. The light beam output from each laser diode 101 is diffused light in a substantially elliptical shape and is converted to parallel light by the collimator lens 102 provided for each color. After the collimator lens 102 for each color, an aperture (slit) 103 with a predetermined gap is provided to regulate the diameter of the light beam. In this specification, the parallel light indicates the state that the diameter of the light flux does not change as the beam travels, and this state is differentiated from the state that optical axes of a plurality of beams are parallel to each other.

Each laser diode 101 is attached to the laser holder 105. The laser holder 105 is attached to the back side of the lens holder 106 formed integrally on the base of the primary optical system. The body tube 107 provided with the collimator lens 102 and the aperture 103 is provided to the front side of the lens holder 106. The light beam emitted from the laser diode 101 exits to the front and outside of the body tube 107 through the collimator lens 102 and the aperture 103.

The light beam emitted from the body tube 107 of the K laser diode 101 goes to the second mirror 111 through the K collimator lens 102 and the K aperture 103. The light beams emitted from the body tubes 107 of the C, M, and Y laser diodes 101 enter into the first mirror 110 through the C, M, and Y collimator lenses 102 and apertures 103, respectively. The first mirror 110 is constituted by three mirrors individually reflecting the C, M, and Y light beams, and the light beam of each color reflected by the mirror travels in the traveling direction of the K light beam and is made incident on the second mirror 111.

The laser diode 101 of each color is disposed at a different height in the sub-scanning direction (direction vertical to the substrate surface). The difference in the height is set to about 2 mm, for example. The first mirror 110 is disposed at a position where only the light beam emitted from the corresponding laser diode 101 is reflected. The three (C, M, and Y) mirrors constituting the first mirror 110 are respectively disposed at a position overlapping with the light beam emitted from the K laser diode 101 in the main scanning direction.

With the configuration as described above, the K light beam emitted from the K laser diode 101 and the C, M, and Y light beams reflected by the first mirror 110 are completely matched in the main scanning direction, have the displacement (vertical difference) in the sub-scanning direction, and are made incident on the second mirror 111 while the optical axes of these light beams are parallel to each other. The light beam of each color emitted from each collimator lens 102 is the parallel light with the diameter of the light flux not changed as the light beam travels.

The second mirror 111 makes the incident light beam of each color K, C, M, and Y incident on the cylindrical lens 112. The cylindrical lens 112 is disposed for focusing the incident light beam of each color in the sub-scanning direction. The light beam of each color emitted from the cylindrical lens 112 is reflected by the third mirror 113 and made incident on the reflection face of the polygon mirror 201.

The cylindrical lens 112 has a lens power in the sub-scanning direction and is set such that the light beam converges in the vicinity of the reflection face of the polygon mirror 201 in the sub-scanning direction depending on the optical path length from the cylindrical lens 112 to the polygon mirror 201. That is, the light beam of each color is made incident on the cylindrical lens 112 while each light beam is the parallel light and converges approximately at the surface of the reflection face of the polygon mirror 201 in the sub-scanning direction. At the same time, the light beam of each color is made incident on the cylindrical lens 112 while the optical axes are parallel to each other and converges at approximately the same position of the surface of the polygon mirror 201.

Since the cylindrical lens 112 does not have a lens power in the main scanning direction, the incident light beam of each color is emitted directly as the parallel light in the main scanning direction and is made incident on the reflection face of the polygon mirror 201. Typically, in the main scanning direction, the parallel light is made incident on the polygon mirror 201. The convergent light in the main scanning direction is not preferable since a negative field curvature is generated by the fθ lens described later. In the sub-scanning direction, to correct a face skew of the reflection face, the light beams are made convergent at the surface of the reflection face. For example, in the sub-scanning direction, the position of the light beam made incident on the reflection face of the polygon mirror 201 is in the vicinity of the center in the height direction of the reflection face.

In the optical scanning unit of the embodiment, four light beams for Y, M, C, and K are deflected by one polygon mirror 201 of the secondary optical system. In this case, the four light beams must be divided after being reflected by the polygon mirror 201 and the displacement in the main scanning direction must not be generated in the light beam for each color. Therefore, the four light beams emitted from the cylindrical lens 112 of the primary optical system are set to be made incident on the polygon mirror 201 at the same position from the same direction in the main scanning direction and are set to be made incident on substantially the same position from the directions with angle differences in the sub-scanning direction. Such optical path setting is achieved by the arrangement of the laser diodes 101 with the vertical differences in the sub-scanning direction since all the light beams for the respective colors are matched in the main scanning direction and travel with predetermined vertical differences in the sub-scanning direction. Therefore, the light beam for each color can be divided by the scanning optical system.

In the above configuration, since the light beam for each color is the parallel light and the optical axes thereof are parallel to each other on the optical path from the collimator lens 102 to the cylindrical lens 112 for each color in the primary optical system, the optical path length from the collimator lens 102 to the cylindrical lens 112 can be freely set.

Figure 4A:
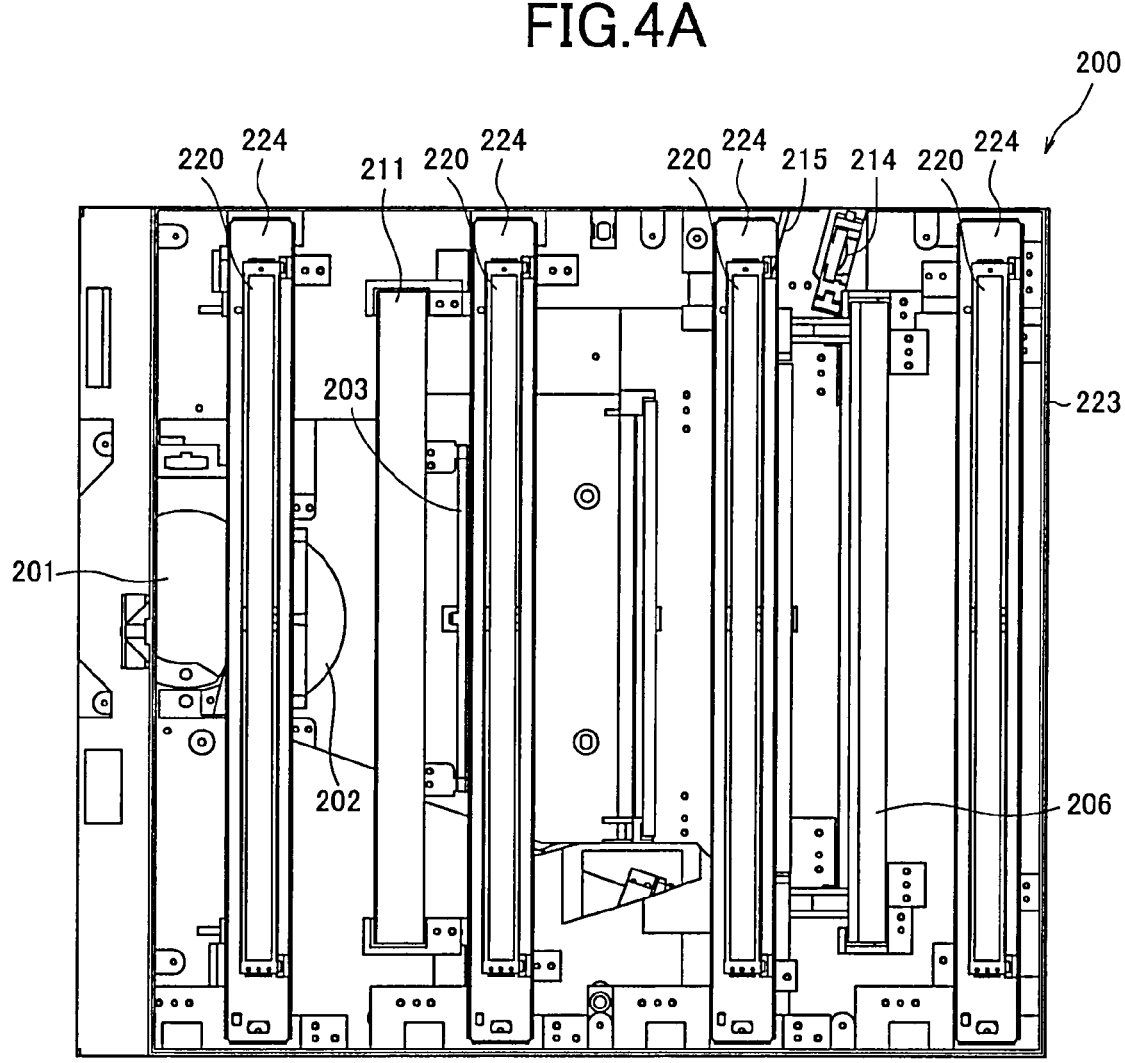
FIGS. 4A and 4B show a configuration example of a secondary optical system of the optical scanning unit.
Figure 4B:
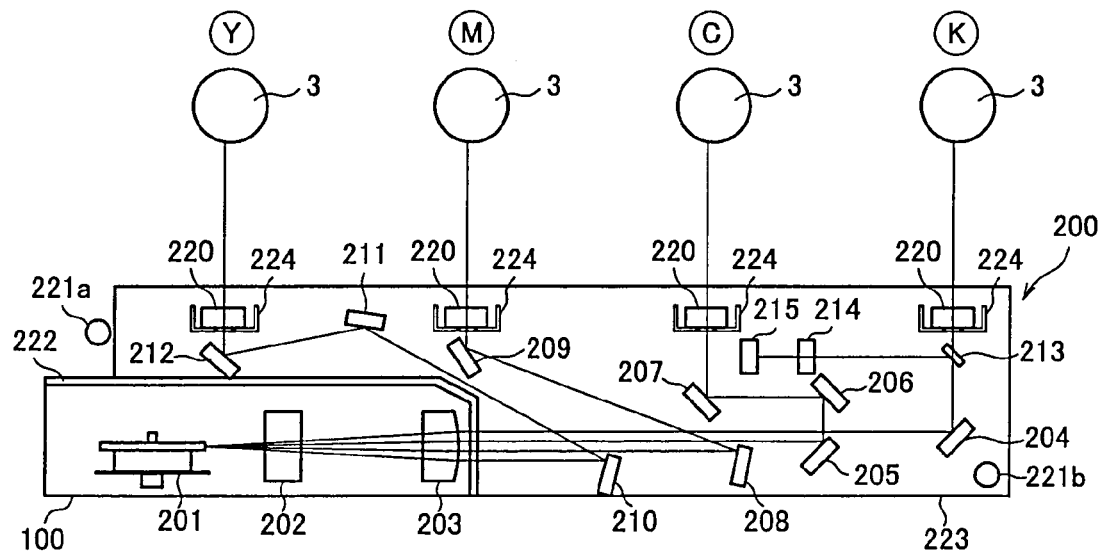

FIGS. 4A and 4B show a configuration example of the secondary optical system of the optical scanning unit; FIG. 4A shows a configuration diagram of the inside of the chassis of the secondary optical system unit viewed from above; and FIG. 4B shows a general configuration of the inside of the chassis 223 and the photoreceptor from a lateral view. In FIGS. 4A and 4B, a numeral 200 is a secondary optical system unit; a numeral 201 is a polygon mirror; a numeral 202 is a first fθ lens; a numeral 203 is a second fθ lens; a numeral 204 is a K mirror; a numeral 205 is a first C mirror; a numeral 206 is a second C mirror; a numeral 207 is a third C mirror; a numeral 208 is a first M mirror; a numeral 209 is a second M mirror; a numeral 210 is a first Y mirror; a numeral 211 is a second Y mirror; a numeral 212 is a third Y mirror; a numeral 213 is a synchronous mirror; a numeral 214 is a BD sensor lens; a numeral 215 is a BD sensor; a numeral 220 is a cylindrical lens for each color; numerals 221a, 221b are fixing shafts; a numeral 222 is a installation position of the primary optical unit; a numeral 223 is a chassis; and a numeral 224 is a frame holding the cylindrical lens.

The polygon mirror 201 has a plurality of (e.g., seven) reflection faces in the rotation direction and is rotationally driven by a polygon motor not shown. The polygon motor is installed in a concave portion on the back side of the chassis 223 where the polygon mirror 201 is installed and a cover is provided for sealing the concave portion. The polygon motor is provided with fins for heat release. The light beam of each color is emitted from the laser diode 101 of the primary optical system, is reflected by the third mirror 113, is reflected by the reflection face of the polygon mirror 201 of the secondary optical system, and scans the photoreceptor drum 3 through the subsequent optical elements.

Each laser beam made incident on the polygon mirror 201 with the angle difference in the sub-scanning direction maintains the angle difference and is divided after passing through the scanning optical system constituted by the first fθ lens 202 and the second fθ lens 203.

The first fθ lens 202 has a lens power in the main scanning direction. Therefore, in the main scanning direction, the parallel light beam emitted from the polygon mirror 201 converges to be a predetermined beam diameter on the surface of the photoreceptor drum 3. The first fθ lens 202 has a function that converts the light beam moved in the main scanning direction at a constant angular speed by the constant angular speed movement of the polygon mirror 201 such that the light beam moves on a scanning line on the photoreceptor drum 3 at a constant linear speed.

The second fθ lens 203 has a lens power in the sub-scanning direction. Therefore, in the sub-scanning direction, the diffused light beam emitted from the polygon mirror 201 is converted to the parallel light. The second fθ lens 203 also has a lens power in the main scanning direction and complements the function of the first fθ lens 202 to enable the control of the beam diameter and the constant linear speed movement of the beam to be performed accurately.

The first fθ lens 202 and the second fθ lens 203 are made of resin. To form an aspheric shape for obtaining desirable characteristics of the fθ lenses, it is preferable to use a resin material for the fθ lenses. Especially, since the second fθ lens 203 has a lens power in both the main scanning direction and the sub-scanning direction, it is preferable to create the second fθ lens 203 with a resin material to obtain a complex aspheric shape that realizes this characteristic. The optimum resin material is selected in consideration of transparency, formability, optical elasticity rate, heat resistance, hygroscopic property, mechanical strength, cost, etc.

Among four light beams for the respective colors divided by the polygon mirror 201 and passing through the first and second fθ lenses 202, 203, the K light beam passes through the first and second fθ lenses 202, 203, is reflected by the K mirror 204, passes through the K cylindrical lens 220, and is made incident on the photoreceptor drum 3 (K). On the photoreceptor drum 3, drawing is performed on the scanning region.

The divided Y light beam is reflected by the first to third Y mirrors 210, 211, 212, passes through the Y cylindrical lens 220, and is made incident on the photoreceptor drum 3 (Y). Similarly, the divided C light beam is reflected by the first to third C mirrors 205, 206, 207, passes through the C cylindrical lens 220, and is made incident on the photoreceptor drum 3 (C). The divided M light beam is reflected by the first and second M mirrors 208, 209, passes through the M cylindrical lens 220, and is made incident on the photoreceptor drum 3 (M)

In the secondary optical system, the cylindrical lens 220 for each color has a lens power in the sub-scanning direction. Therefore, in the sub-scanning direction, the parallel incident light beam converges to be a predetermined beam diameter on the photoreceptor drum 3. In the main scanning direction, the light beam becomes a convergent light in the aforementioned first fθ lens and converges directly on the photoreceptor drum 3. The cylindrical lens 220 is made of resin. For the long cylindrical lens 220 covering the entire scanning width such as the optical scanning unit, it is preferred for the lens to be formed as a resin lens.

The charged photoreceptor drum 3 is exposed to the light beam of each color emitted from the cylindrical lens 220 according to the image data. In this way, an electrostatic latent image corresponding to the image data is formed on the surface of the photoreceptor drum 3. Each electrostatic latent image formed on each photoreceptor drum 3 is developed with toner of Y, M, C, or K by the development unit.

Description will be made of the state of the light beam of each color among the optical elements in the aforementioned embodiment in an organized way. FIGS. 5A and 5B are diagrams for describing the state of the individual light beam of each color in the primary optical system and the secondary optical system; FIG. 5A shows a shape of one light beam in the main scanning direction schematically; and FIG. 5B shows a shape of one light beam in the sub-scanning direction schematically.

Description will be made of the behavior of the light beam in the main scanning direction shown in FIG. 5A. The light beam emitted from the laser diode 101 of the primary optical system is the diffused light and is made incident on the collimator lens 102. In the main scanning direction, the angle of the diffused light from the laser diode 101 is about 30 degrees.

The collimator lens 102 converts the incident diffused light to the parallel light, which is emitted. The aperture 103 is provided after the collimator lens 102, and the diameter of the light beam is regulated by the opening of the aperture 103. The opening diameter of the aperture 103 in the main scanning direction is about 7 mm in this case.

The light beam of the parallel light emitted from the aperture 103 is reflected by the first mirror 110 and the second mirror 111 (only the second mirror 111 for K) (not shown in FIG. 5A) and is made incident on the cylindrical lens 112 of the primary optical system. Since the cylindrical lens 112 of the primary optical system does not have a lens power in the main scanning direction, the incident parallel light passes through without change.

The light beam of the parallel light emitted from the cylindrical lens 112 is reflected by the third mirror 113 (not shown in FIG. 5A) and is made incident on the reflection face of the polygon mirror 201. As shown in the figure, the reflection face of the polygon mirror 201 changes its angle in the main scanning direction along with the rotation of the polygon mirror 201.

The light beams of the parallel light reflected by the polygon mirror 201 move in the main scanning direction at a constant angular speed, are made incident on the first fθ lens 202, and are then made incident on the second fθ lens 203. The first fθ lens 202 and the second fθ lens 203 have a lens power in the main scanning direction and convert the parallel incident light beam to the convergent light converging on the surface of the photoreceptor drum 3. The light beams moving in the main scanning direction at a constant angular speed are converted such that the light beams move on the scanning line on the photoreceptor drum 3 at a constant linear speed.

The second fθ lens 203 is a lens that complements the first fθ lens 202 and corrects the light beam emitted from the first fθ lens 202 such that the light beam behaves as intended.

The optical path between the second fθ lens 203 and the photoreceptor drum 3 is provided with the mirror(s) (one or a plurality of mirrors for each color) (not shown in FIG. 5A) for folding and guiding the optical path of each color to the target photoreceptor drum 3 and the cylindrical lens 220 of the secondary optical system. Since the cylindrical lens 220 does not have a lens power in the main scanning direction, the light beam emitted from the second fθ lens 203 is not affected in the main scanning direction and travels to the photoreceptor drum 3. On the photoreceptor drum 3, the spot diameter of the light beam in the main scanning direction is about 60 μm.

Description will be made of the behavior of the light beam in the sub-scanning direction shown in FIG. 5B. The light beam emitted from the laser diode 101 is the diffused light and is made incident on the collimator lens 102, as is the case with the main scanning direction. However, in the sub-scanning direction, the angle of the diffused light from the laser diode 101 is about 11 degrees, which is smaller than that in the main scanning direction.

The collimator lens 102 converts the incident diffused light to the parallel light, which is emitted. The aperture 103 is provided after the collimator lens 102, and the diameter of the light beam is regulated by the opening of the aperture 103. The opening diameter of the aperture 103 is about 2 mm in this case.

The light beam of the parallel light emitted from the aperture 103 is reflected by the first mirror 110 and the second mirror 111 (only the second mirror 111 for K) (not shown in FIG. 5B) and is made incident on the cylindrical lens 112 of the primary optical system. Since the cylindrical lens 112 of the primary optical system has a lens power in the sub-scanning direction, the incident parallel light is converted to the convergent light that approximately converges on the reflection face of the polygon mirror 201. The light beam of the parallel light emitted from the cylindrical lens 112 is reflected by the third mirror 113 (not shown in FIG. 5B) and is made incident on the reflection face of the polygon mirror 201. In the sub-scanning direction, the light beam converges at approximately the center of the reflection face in the height direction. The face skew of the reflection face is corrected by generating a conjugate relationship between the reflection face of the polygon mirror 201 and the surface of the photoreceptor drum 3.

The light beam reflected by the polygon mirror 201 becomes the diffused light, is made incident on the first fθ lens 202, and is then made incident on the second fθ lens 203. Since the first fθ lens 202 does not have a lens power in the sub-scanning direction, the light beam of the diffused light made incident on the first fθ lens 202 passes through without change.

The second fθ lens 203 has a lens power in the sub-scanning direction and converts the incident diffused light beam to the parallel light in the sub-scanning direction.

The optical path between the second fθ lens 203 and the photoreceptor drum 3 is provided with the mirror(s) (one or a plurality of mirrors for each color) (not shown in FIG. 5B) for folding and guiding the optical path of each color to the target photoreceptor drum 3 and the cylindrical lens 220 of the secondary optical system. The cylindrical lens 220 has a lens power in the sub-scanning direction, and the light beam of the parallel light emitted from the second fθ lens 203 is converted to the light approximately converging on the surface of the photoreceptor drum 3. On the photoreceptor drum 3, the spot diameter of the light beam in the sub-scanning direction is about 67 μm.

Figure 6:
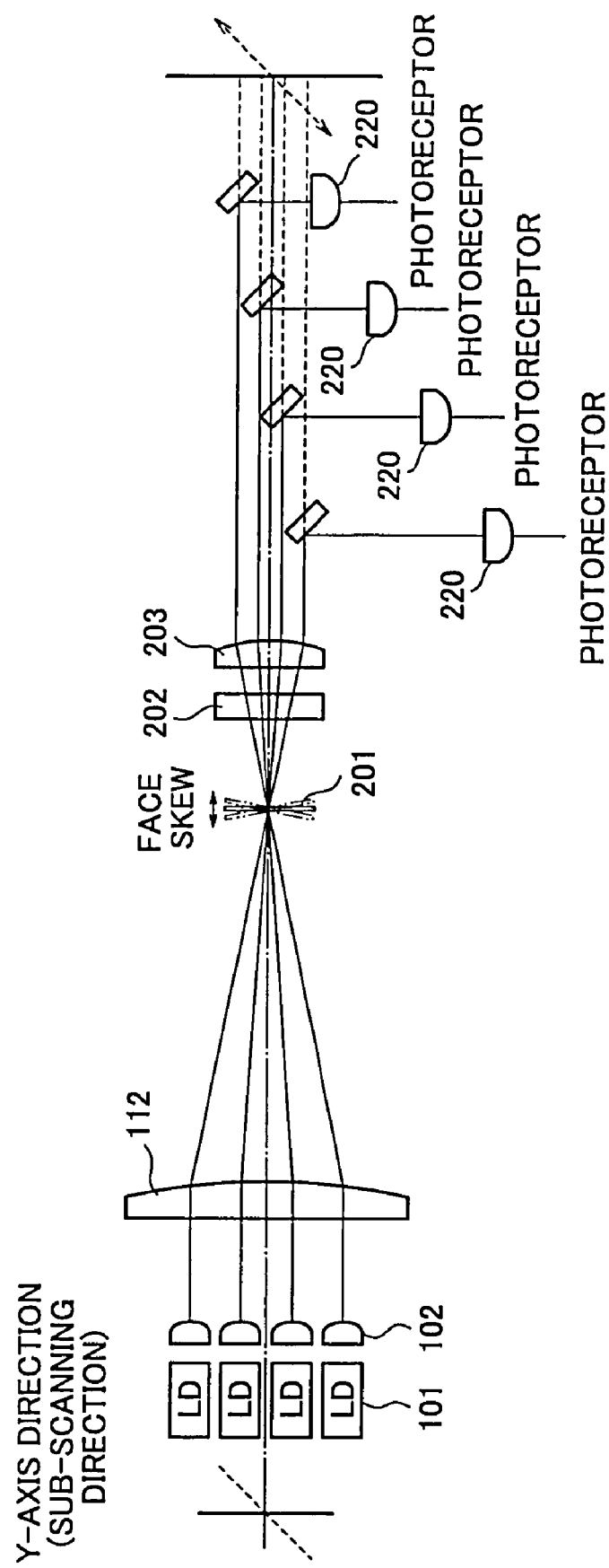
FIG. 6 shows optical paths of four light beams in the sub-scanning direction schematically.

FIG. 6 shows optical paths of four light beams in the sub-scanning direction schematically. With regard to the optical paths of the light beams for the four colors Y, M, C, and K, as described above, although the four light beams travels through the same position in the main scanning direction, in the sub-scanning direction, the four light beams emitted from the laser diodes 101 are apart from each other by the height differences of the laser diodes 101.

As shown in FIG. 6, the four light beams are emitted from the four laser diodes 101 (for Y, M, C, and K), pass through the collimator lenses 102, and are made incident on the cylindrical lens 112 of the primary optical system with the optical axes thereof parallel to each other. The cylindrical lens 112 converts each of the four light beams such that the light beams converge at approximately the center of the reflection face of the polygon mirror 201. That is, in the sub-scanning direction, the four light beams converge at approximately the same position on the reflection face of the polygon mirror 201 with angle differences to each other. In the main scanning direction, the four beams are made incident at the same position on the reflection face of the polygon mirror 201 from the same direction. In FIG. 6, the first to third mirrors 110 to 113 are not shown.

The four light beams reflected by the polygon mirror 201 are diffused again with angle differences to each other and made incident on the second fθ lens 203 via the first fθ lens 202. Since the first fθ lens 202 does not have a lens power in the sub-scanning direction, the four light beams made incident on the first fθ lens 202 pass through without change. The second fθ lens 203 has a lens power in the sub-scanning direction and converts the four incident light beams such that the optical axes thereof become parallel to each other.

The optical path between the second fθ lens 203 and the photoreceptor drum 3 is provided with the mirror(s) (one or a plurality of mirrors for each color) (not shown in FIG. 6) for folding the optical path of each color and guiding it to the target photoreceptor drum 3, and these mirrors utilize the displacements of the optical axes of the four light beams emitted from the second fθ lens 203 to separate and guide the four beams to the respective target photoreceptor drums 3. The lengths of the optical paths between the second fθ lens 203 and the cylindrical lenses 220 in the secondary optical system are the same for all the four light beams for the respective colors.

Description will be made of an installation example of a BD (Beam Detect) sensor for detecting the light beam to generate a reference signal for starting writing before the start of the main scanning of the light beam on the photoreceptor drum 3.

Among the light beams reflected by the polygon mirror 201 toward the photoreceptor drum 3, the light beam used for forming an image on the photoreceptor drum 3, i.e., the light beam for scanning a main scanning line is referred to as a main scanning beam. An image region is defined as a spacial region passed through by the main scanning beam at the time of the scanning, and a non-image region is defined as a region other than the image region.

When the light beam scans the photoreceptor drum 3, the light beam scans the main scanning line periodically. Since the photoreceptor drum 3 is rotated, the photoreceptor drum 3 is scanned at a different place every certain period. Every time the scanning of the light beam is performed, the writing start position on the scanning line must be the same.

To detect the writing start position on the scanning line, the optical scanning unit is provided with a synchronous detector. With reference to FIGS. 4A and 4B, the synchronous detector is constituted by a BD sensor (synchronous detection sensor) 215 for detecting a synchronous detection beam that is the light beam in the non-image region, a folding mirror (synchronous mirror) 213 of the synchronous detection beam that is guiding means for guiding the synchronous detection beam to the BD sensor 215, and a BD sensor lens 214 for collecting the synchronous detection beam to the BD sensor 215.

The synchronous detection beam is a signal for synchronization and is the light beam which is reflected by the synchronous mirror 213 after being emitted from the polygon mirror 201 and passing through the first and second fθ lenses 202, 203. The synchronous detection beam is folded by the synchronous mirror 213 and arrives at the BD sensor 215 via the BD sensor lens 214. The BD sensor 215 outputs a sensor signal depending on a received light amount. A controlling portion of the optical scanning unit (e.g., an LSU controller described later) generates a synchronous signal (BD signal) for determining the image writing start position based on the sensor signal from the BD sensor 215. Specifically, the BD signal is generated if the received light amount of the BD sensor 215 is equal to or more than a light amount necessary at least for exposing the photoreceptor drum 3 with the laser beam to form an electrostatic latent image. The BD signal is used for a scanning start reference signal in the main scanning direction and the writing start position on each line is synchronized in the main scanning direction based on this signal.

The synchronous detector outputs an error signal if the BD sensor 215 cannot detect the light beam. The image forming apparatus equipped with the optical scanning unit stops the operation of the apparatus and displays, for example, a predetermined service code on the display screen to notify a user of the failure in the writing start position in the scanning direction.

The BD sensor 215 detecting the writing start position in the scanning direction is provided only on the optical path of the K light beam to support only the K light beam among the four light beams and, with reference to its detection result, the light beams for other colors start the scanning at the predetermined writing start timing of the image data.

Figure 7:
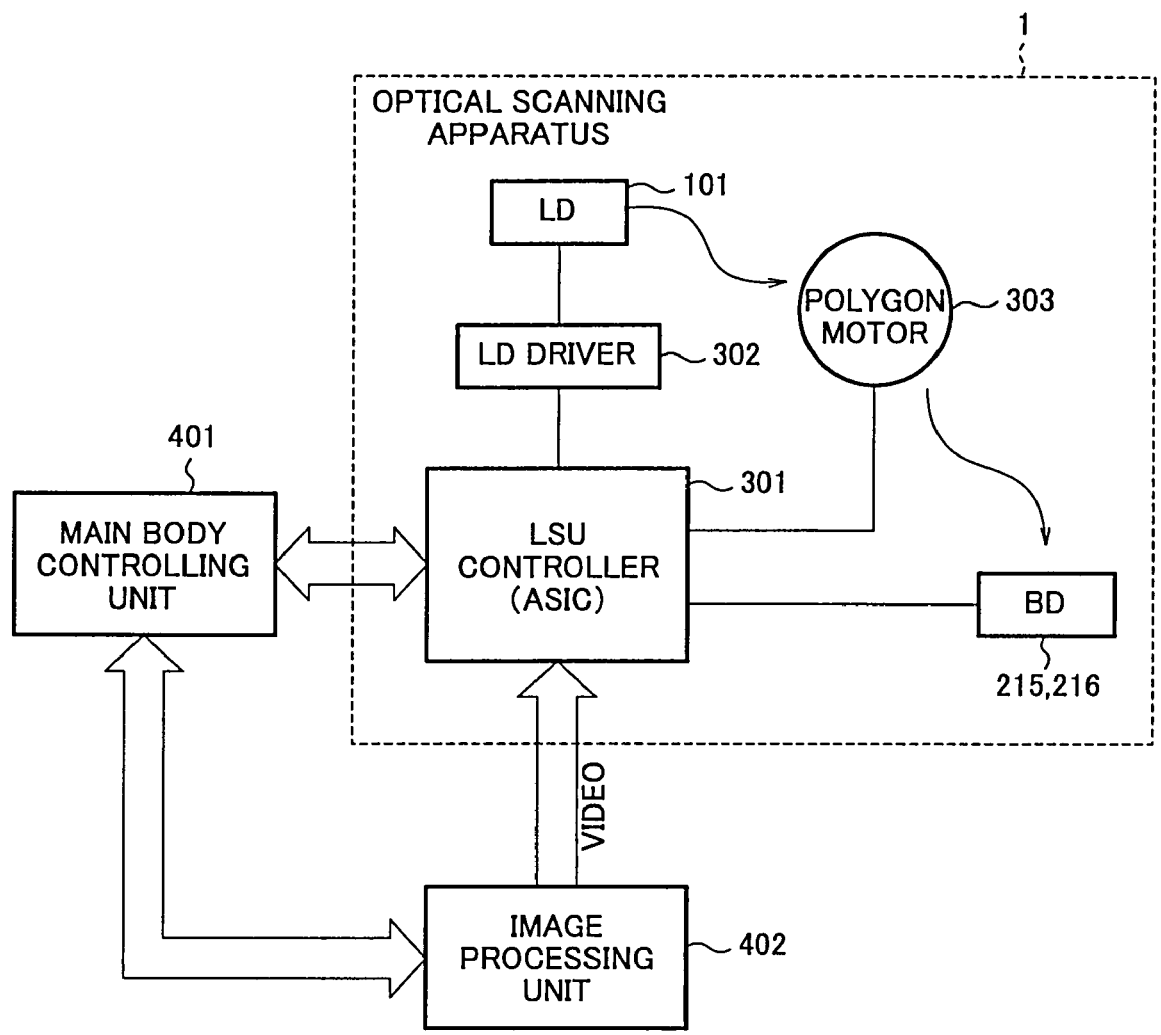
FIG. 7 is a block diagram for describing a configuration example of a control system of the optical scanning unit.

FIG. 7 is a block diagram for describing a configuration example of a control system of the optical scanning unit.

An LSU controller 301 inputs the image data signal output from an image memory, etc. of an image processing portion 402 of the image forming apparatus and sends the image data signal to a laser driver circuit (LD Driver) 302 in conformity with the scanning start timing sent from a main body controlling portion 401 of the image forming apparatus to control the lighting of the laser diode (LD) 101.

The LSU controller 301 controls the reference rotation movement of a polygon motor 303 driving a polygon mirror in conformity with the specification in the main scanning direction of the image forming apparatus. The LSU controller 301 detects the timing of the main scanning through the reception of the light beam at the BD sensor 215 detecting the writing start position in the main scanning direction and outputs an error signal to the main body controlling portion 401 if an error is generated. The LSU controller 301 inputs the detection signal of the BD sensor 216 detecting the writing position in the sub-scanning direction and outputs an error signal to the main body controlling portion 401 if an error is generated. The LSU controller 301 is constituted by ASIC (application specific integrated circuits).

Description will be made of an adjustment mechanism of the optical elements in the embodiment. The optical scanning unit of the embodiment includes several adjustment mechanisms for the optical elements such as mirrors and lenses on the optical path guiding the light beam emitted from the laser diode 101 to the photoreceptor drum 3 of each color. The adjustment mechanisms can adjust angles and positions of the optical elements relative to the light beams made incident on the optical elements. The adjustment mechanisms can perform the adjustment suitably at the time of the assembly adjustment of the optical scanning unit or at a given point in time after the assembly.

The optical scanning unit of the embodiment includes the adjustment mechanisms for the second mirror 111 and the third mirror 113 of the primary optical system and the cylindrical lenses 220 of the secondary optical system. The mechanisms for adjusting angles and positions are included not only in these optical elements but also in the folding mirror of the secondary optical system, etc. appropriately. For example, the writing start position in the main scanning direction detected by the BD sensor 215 is adjusted by changing the angle of the final mirror before the cylindrical lens 220 of the secondary optical system.

Description will be made of the adjustment mechanisms of the second and third mirrors 111, 113 of the primary optical system. In the optical scanning unit of the embodiment, the angles of the second mirror 111 and the third mirror 113 of the primary optical system are independently and variably set. The second mirror 111 and the third mirror 113 function to take partial charge of the optical path adjustment of the light beam in the main scanning direction and the sub-scanning direction, respectively.

The angle of the second mirror 111 can be adjusted in the direction of an arrow A shown in FIG. 3. That is, the second mirror 111 is configured such that the reflection optical paths of the four light beams, which are emitted from the laser diodes 101 and have the parallel optical axes in the sub-scanning direction, are adjustable in the main scanning direction. Although the configuration for varying the angle of the second mirror 111 is not limited, for example, a support member is provided for rotatably supporting the second mirror 111 (or a frame portion holding the second mirror 111) so that it can be rotated in the direction of the arrow A and the support member is fixed on the base 120 of the primary optical system. The support member is provided with an adjustment screw that contacts with the back side of the second mirror 111 to be advanced or retracted in the direction for rotating the second mirror 111 in the direction of the arrow A. An adjuster can suitably adjust the adjustment screw to change the tilt of the second mirror 111 to adjust the optical path in the main scanning direction of the light beam emitted from the second mirror 111. Biasing means such as a spring may be provided for biasing the second mirror 111 such that the second mirror 111 follows the movement of the adjustment screw when the adjustment screw is adjusted in the direction away from the second mirror 111.

The angle of the third mirror 113 can be adjusted in the direction of an arrow B shown in FIG. 3. That is, the third mirror 113 is configured such that the reflection optical paths of the four light beams, which are emitted from the laser diodes 101 and have the parallel optical axes in the sub-scanning direction, are adjustable in the sub-scanning direction. Although the configuration for varying the angle of the third mirror 113 is not limited as is the case with the second mirror 111, for example, a support member is provided for rotatably supporting the third mirror 113 (or a frame portion holding the third mirror 113) so that it can be rotated in the direction of the arrow B and the support member is fixed on the base 120 of the primary optical system. The support member is provided with an adjustment screw that contacts with the back side of the third mirror 113 to be advanced or retracted in the direction for rotating the third mirror 113 in the direction of the arrow B. An adjuster can suitably adjust the adjustment screw to change the tilt of the third mirror 113 to adjust the optical path in the sub-scanning direction of the light beam emitted from the third mirror 113. Biasing means such as a spring may be provided for biasing the third mirror 113 such that the third mirror 113 follows the movement of the adjustment screw when the adjustment screw is adjusted in the direction away from the third mirror 113.

In the above configuration, the optical path adjustment can be performed with the second and third mirrors 111, 113 in the main scanning direction and the sub-scanning direction, respectively, at the positions on the optical path before and after the cylindrical lens of the primary optical system.

In another configuration example of the second mirror 111 and the third mirror 113, the angle adjustment may be performed not only in either the main scanning direction or the sub-scanning direction but also in both the main scanning direction and the sub-scanning direction. This mechanism can be applied to one or both of the second mirror 111 and the third mirror 113.

In this case, for example, a frame portion is provided for holding the second/third mirror 111, 113 such that the second/third mirror 111, 113 can be displaced in both the main scanning direction and the sub-scanning direction, and the contact adjustment screw is provided on one point of the back side of the second/third mirror 111, 113. When the adjustment screw is adjusted and the back side is pushed, that portion may be advanced toward the front side to enable the angle adjustment in the main scanning and sub-scanning directions as a result. In this case, biasing means such as a spring may also be provided for biasing the second/third mirror 111, 113 such that the second/third mirror 111, 113 follows the movement of the adjustment screw when the adjustment screw is adjusted in the direction away from the second/third mirror 111, 113.

The adjustment mechanism of the second/third mirror 111, 113 is configured such that the adjustment mechanism can be operated from one side of the unit configured to be the optical scanning unit. This side of the unit is arranged to be the operational side (front side) of the image forming apparatus when the optical scanning unit is incorporated into the image forming apparatus. With such a configuration, the second/third mirror 111, 113 can be adjusted easily from the operational side of the image forming apparatus.

According to the present invention, effects as follows can be obtained.

According to the present invention, in the adjustment mechanism that adjusts the angles and positions of the optical elements making the light beams incident on the polygon mirror performing optical scanning, highly accurate adjustment can be easily performed. Particularly, since the adjustment mechanisms are provided on the both sides of the cylindrical lens for collecting the light beams linearly in the main scanning direction on the polygon mirror and these adjustment mechanisms can perform the adjustment in the main scanning direction and the sub-scanning direction separately, the light beams can be adjusted highly accurately.

The invention claimed is:

1. An optical scanning unit, comprising:
    a polygon mirror,
    a light source emitting a plurality of different colored light beams according to image data, the plurality of light beams irradiating the polygon mirror and the optical scanning unit converting the plurality of different colored light beams to respective different colored scanning lights by the rotation of the polygon mirror,
    a plurality of photoreceptors, the optical scanning unit scanning and exposing the plurality of photoreceptors simultaneously with the plurality of scanning lights to form latent images on the respective photoreceptors,
    optical elements irradiating the polygon mirror with each light beam configured integrally,
    means for collectively adjusting the different colored light beams illuminating the polygon mirror in the main scanning direction, and
    means for adjusting the different colored light beams illuminating the polygon mirror in the sub-scanning direction.

2. The optical scanning unit of claim 1, wherein the means for collectively adjusting and the means for adjusting are provided on respective sides of a lens that has a power only in the sub-scanning direction for collecting the respective light beams linearly in the main scanning direction on the polygon mirror.

3. The optical scanning unit of claim 2, wherein the means for collectively adjusting are provided on the near side of the optical path of the lens that has a power only in the sub-scanning direction from the light source and the means for adjusting are provided on the far side of the optical path of the lens that has a power only in the sub-scanning direction from the light source.

4. The optical scanning unit of claim 2, the optical scanning unit comprising: a first laser diode, a second laser diode, a third laser diode, and a fourth laser diode, which act as the light source; a first mirror that reflects the light beams emitted from the second to fourth laser diodes; a second mirror that reflects the light beam emitted from the first laser diode and the light beams reflected by the first mirror; a primary optical system cylindrical lens that acts on the light beams reflected by the second mirror; and a third mirror that reflects the light beams emitted from the primary optical system cylindrical lens toward the polygon mirror, wherein the lens that has a power only in the sub-scanning direction is the cylindrical lens, wherein the second mirror is provided with the means for collectively adjusting that change the light beams in the main scanning direction, and wherein the third mirror is provided with the means for adjusting that change the light beams in the sub-scanning direction.

5. The optical scanning unit of claim 4, wherein the first mirror is constituted by a mirror group composed of a plurality of mirrors.

6. An image forming apparatus comprising the optical scanning unit of claim 1 and the photoreceptors, wherein the optical scanning unit forms latent images on the photoreceptors, the latent images being developed for image formation.

7. An image forming apparatus comprising the optical scanning unit of claim 2 and the photoreceptors, wherein the optical scanning unit forms latent images on the photoreceptors, the latent images being developed for image formation.

8. An image forming apparatus comprising the optical scanning unit of claim 3 and the photoreceptors, wherein the optical scanning unit forms latent images on the photoreceptors, the latent images being developed for image formation.

9. An image forming apparatus comprising the optical scanning unit of claim 4 and the photoreceptors, wherein the optical scanning unit forms latent images on the photoreceptors, the latent images being developed for image formation.

10. An image forming apparatus comprising the optical scanning unit of claim 5 and the photoreceptors, wherein the optical scanning unit forms latent images on the photoreceptors, the latent images being developed for image formation.

* * * * *